(12) United States Patent
Fife

(10) Patent No.: US 6,906,440 B1
(45) Date of Patent: Jun. 14, 2005

(54) BRACKET ASSEMBLY HAVING A PLURALITY OF PLATES FOR A DYNAMOELECTRIC MACHINE

(75) Inventor: W. R. Hugh Fife, Omemee (CA)

(73) Assignee: General Electric Canada, Inc., Ontario (CA)

(*) Notice: Subject to any disclaimer, the term of this patent is extended or adjusted under 35 U.S.C. 154(b) by 0 days.

(21) Appl. No.: 09/602,525

(22) Filed: Jun. 13, 2000

(51) Int. Cl.$^7$ .......................... H02K 5/24; H02K 5/00; H02K 5/16; H02K 7/08
(52) U.S. Cl. .......................... 310/91; 310/89; 310/90; 310/51
(58) Field of Search .................. 384/428, 438; 310/91, 89, 51, 90

(56) References Cited

U.S. PATENT DOCUMENTS

| | | | | |
|---|---|---|---|---|
| 1,834,860 A | * | 12/1931 | Morrill | 310/51 |
| 2,127,979 A | * | 8/1938 | Loftis | 248/606 |
| 2,209,477 A | * | 7/1940 | Reibel | 248/606 |
| 2,312,848 A | * | 3/1943 | Pezzillo | 417/356 |
| 2,602,098 A | * | 7/1952 | Loveland et al. | 310/154.18 |
| 2,905,411 A | * | 9/1959 | Cunningham | 248/603 |
| 3,002,794 A | * | 10/1961 | Bluemink | 310/51 |
| 3,064,152 A | * | 11/1962 | De Paul et al. | 310/254 |
| 3,114,061 A | * | 12/1963 | Michel et al. | 310/60 R |
| 3,223,315 A | * | 12/1965 | Smith | 494/14 |
| 3,228,597 A | * | 1/1966 | Walker et al. | 494/14 |
| 3,313,968 A | * | 4/1967 | Kaiser | 310/258 |
| 3,343,016 A | * | 9/1967 | Lewis | 310/90 |
| 3,463,949 A | * | 8/1969 | Stone | 310/42 |
| 3,720,852 A | * | 3/1973 | Vieweg | 310/90 |
| 3,916,233 A | * | 10/1975 | Vockler | 310/89 |
| 3,983,429 A | * | 9/1976 | Allardice, Jr. | 310/91 |
| 4,013,910 A | | 3/1977 | Deming | |
| 4,015,155 A | * | 3/1977 | Lang | 310/89 |
| 4,076,196 A | | 2/1978 | Levine | |
| 4,079,275 A | * | 3/1978 | Fu | 310/57 |
| 4,101,139 A | | 7/1978 | Nordin | |
| 4,116,410 A | * | 9/1978 | Boyd et al. | 248/581 |
| 4,174,821 A | * | 11/1979 | Levine | 248/300 |
| 4,186,319 A | * | 1/1980 | Dochterman | 310/89 |
| 4,216,399 A | * | 8/1980 | Bartheld et al. | 310/91 |
| 4,260,125 A | | 4/1981 | Levine | |
| 4,315,176 A | | 2/1982 | Sendo et al. | |
| 4,322,647 A | * | 3/1982 | Neroda et al. | 310/71 |
| 4,340,830 A | * | 7/1982 | Hoyer-Ellefsen | 310/89 |
| 4,386,812 A | | 6/1983 | Anderson | |
| 4,426,163 A | * | 1/1984 | Schluchter et al. | 384/428 |
| 4,426,593 A | | 1/1984 | Chernoff et al. | |
| 4,440,033 A | | 4/1984 | Kurihara et al. | |
| 4,445,056 A | | 4/1984 | Gaylord | |
| 4,460,838 A | | 7/1984 | Ulicny | |
| 4,506,179 A | | 3/1985 | Chernoff et al. | |
| 4,549,346 A | * | 10/1985 | White | 29/736 |
| 4,598,603 A | * | 7/1986 | Hiramitsu et al. | 74/484 R |
| 4,626,726 A | * | 12/1986 | King et al. | 310/91 |
| 4,631,433 A | * | 12/1986 | Stokes | 310/89 |

(Continued)

Primary Examiner—Darren Schuberg
Assistant Examiner—Julio C. Gonzalez
(74) Attorney, Agent, or Firm—Armstrong Teasdale LLP

(57) ABSTRACT

A bracket assembly for a dynamoelectric machine includes a base plate and a bracket support assembly. The bracket support assembly includes a first end plate, a second end plate and a support member connected to at least one support plate. The bracket support assembly reinforces the bracket assembly and provides a configuration effectively achieving a desired natural frequency which is unlikely to be excited in use.

21 Claims, 4 Drawing Sheets

U.S. PATENT DOCUMENTS

| | | | | |
|---|---|---|---|---|
| 4,642,499 A | * | 2/1987 | Brem | 310/89 |
| 4,726,112 A | * | 2/1988 | King et al. | 248/581 |
| 4,763,031 A | * | 8/1988 | Wang | 310/83 |
| 4,766,337 A | | 8/1988 | Parkinson et al. | |
| 4,786,834 A | * | 11/1988 | Grant et al. | 310/168 |
| 4,807,354 A | * | 2/1989 | Capuano et al. | 29/596 |
| 4,888,508 A | | 12/1989 | Adam et al. | |
| 4,897,571 A | * | 1/1990 | Isozumi | 310/239 |
| 4,899,432 A | | 2/1990 | Adam et al. | |
| 4,931,681 A | | 6/1990 | Spaggiari | |
| 4,967,111 A | * | 10/1990 | Andrieux et al. | 29/598 |
| 4,988,905 A | * | 1/1991 | Tolmie, Jr. | 310/68 B |
| 5,001,377 A | | 3/1991 | Parkinson | |
| 5,068,556 A | | 11/1991 | Lykes et al. | |
| 5,093,956 A | * | 3/1992 | Saunders et al. | 15/351 |
| 5,113,103 A | | 5/1992 | Blum et al. | |
| 5,129,737 A | | 7/1992 | Stenner | |
| 5,177,386 A | * | 1/1993 | Shimada | 310/81 |
| 5,182,482 A | | 1/1993 | Burke | |
| 5,280,210 A | | 1/1994 | Kress et al. | |
| 5,287,028 A | * | 2/1994 | Suzuki et al. | 310/40 MM |
| 5,296,769 A | | 3/1994 | Havens et al. | |
| 5,315,751 A | * | 5/1994 | Hammer | 29/598 |
| 5,322,373 A | | 6/1994 | Oakes et al. | |
| 5,355,373 A | | 10/1994 | Salmon et al. | |
| 5,365,137 A | * | 11/1994 | Richardson et al. | 310/258 |
| 5,386,163 A | * | 1/1995 | Heilman | 310/261 |
| 5,497,040 A | * | 3/1996 | Sato | 310/156.26 |
| 5,501,117 A | | 3/1996 | Mensing et al. | |
| 5,515,748 A | | 5/1996 | Yagi | |
| 5,692,886 A | | 12/1997 | Kobayashi et al. | |
| 5,710,468 A | * | 1/1998 | Church et al. | 310/90 |
| 5,767,596 A | * | 6/1998 | Stark et al. | 310/89 |
| 5,786,647 A | | 7/1998 | Vollmer et al. | |
| 5,852,338 A | * | 12/1998 | Boyd, Jr. et al. | 310/89 |
| 5,853,643 A | | 12/1998 | Bauer | |
| 5,873,697 A | | 2/1999 | Gully | |
| 5,914,547 A | | 6/1999 | Barahia et al. | |
| 5,949,163 A | * | 9/1999 | Karafillis et al. | 310/51 |
| 5,952,754 A | | 9/1999 | Mok | |
| 5,954,169 A | * | 9/1999 | Jensen | 188/378 |
| 5,969,447 A | * | 10/1999 | Periyathamby et al. | 310/89 |
| 6,129,194 A | * | 10/2000 | Booth et al. | 192/84.941 |
| 6,158,978 A | * | 12/2000 | Norbury, Jr. | 248/638 |
| 6,218,752 B1 | * | 4/2001 | Chang et al. | 310/91 |
| 6,407,474 B1 | * | 6/2002 | Mahn et al. | 310/89 |
| 6,465,927 B2 | * | 10/2002 | Shiraki et al. | 310/239 |
| 6,553,645 B2 | * | 4/2003 | Nakamura et al. | 29/596 |

* cited by examiner

US 6,906,440 B1

BRACKET ASSEMBLY HAVING A PLURALITY OF PLATES FOR A DYNAMOELECTRIC MACHINE

BACKGROUND OF THE INVENTION

This invention relates generally to dynamoelectric machines, and more particularly, to support brackets for bearing assemblies in dynamoelectric machines.

Dynamoelectric machines typically include a stator and a rotor positioned within a bore of the stator. In certain dynamoelectric machines, energization of the stator causes the rotor to rotate with respect to the stator. In other dynamoelectric machines, rotation of the rotor with respect to the stator causes an electric current to be generated. The rotor typically includes an extended rotor shaft rotatably mounted upon bearings. These bearings are generally mounted to a machine housing via bearing support brackets.

Bearing support brackets are subject to static and dynamic stresses from supporting the dynamoelectric machine rotor and associated components coupled to the rotor shaft. In use, a varying degree of vibration is experienced by the bearing support brackets due to varying loads and operating conditions. Typically, bearing support brackets are specifically designed for use with a particular dynamoelectric machine to avoid possible excitation of the brackets at their natural frequencies. These brackets, however, become excessively heavy and costly as the dynamoelectric machine size increases.

Accordingly, it would be desirable to provide a low cost bracket having a stiffness sufficient to avoid excitation thereof at selected undesirable frequencies.

BRIEF SUMMARY OF THE INVENTION

In an exemplary embodiment, a dynamoelectric machine includes a bearing support bracket assembly including a base plate and a bracket support assembly connected thereto. The bracket support assembly includes a curved support member contacting a first end plate and a second end plate. At least one support plate extends from the support member and contacts the first end plate and the second end plate. In addition, the bracket support assembly includes a side plate opposite the support member that extends between the base plate and the support plate. The support plate is separated from the base plate by a distance and contacts the support member, the end plates and the side plate.

Attachment of the bracket support assembly to the base plate reinforces the bearing support bracket assembly and provides a configuration effectively achieving the desired natural frequency which is unlikely to be excited in use.

DETAILED DESCRIPTION OF THE INVENTION

Figure 1:
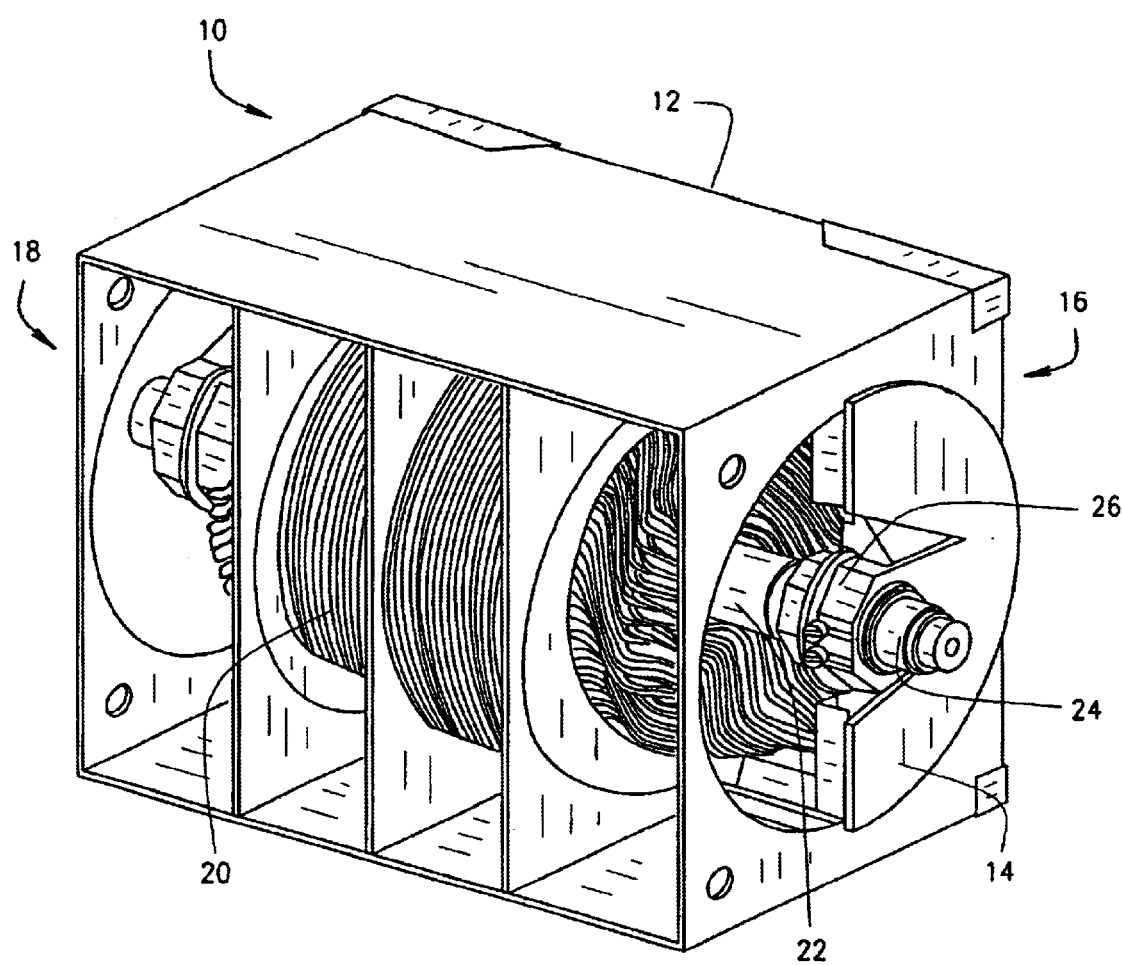
FIG. 1 is a perspective view of a known dynamoelectric machine.

FIG. 1 illustrates a known dynamoelectric machine 10, the construction and operation of which is well known, and with which the present invention may be practiced. It is contemplated, however, that the present invention is equally applicable to other types of dynamoelectric machines, and the description of machine 10 is therefore provided for illustrative purposes only rather than by way of limitation. Machine 10 includes a frame 12, a first bearing support bracket assembly 14 coupled to frame 12 at a first end 16, and a second bearing support bracket assembly (not shown) coupled to frame 12 at a second end 18.

Motor assembly 10 also includes a stator 20 and a rotor 22. Rotor 22 includes a rotor core (not shown) and a rotor shaft 24 extending through the rotor core. Stator 20 is mounted in frame 12 and includes a bore (not shown) extending therethrough. Rotor 22 is rotatably mounted in frame 12 with the rotor core extending through the stator bore and rotor shaft 24 rotatably supported by a bearing assembly 26. Bearing assembly 26 is supported by first bearing support bracket assembly 14.

Figure 2:
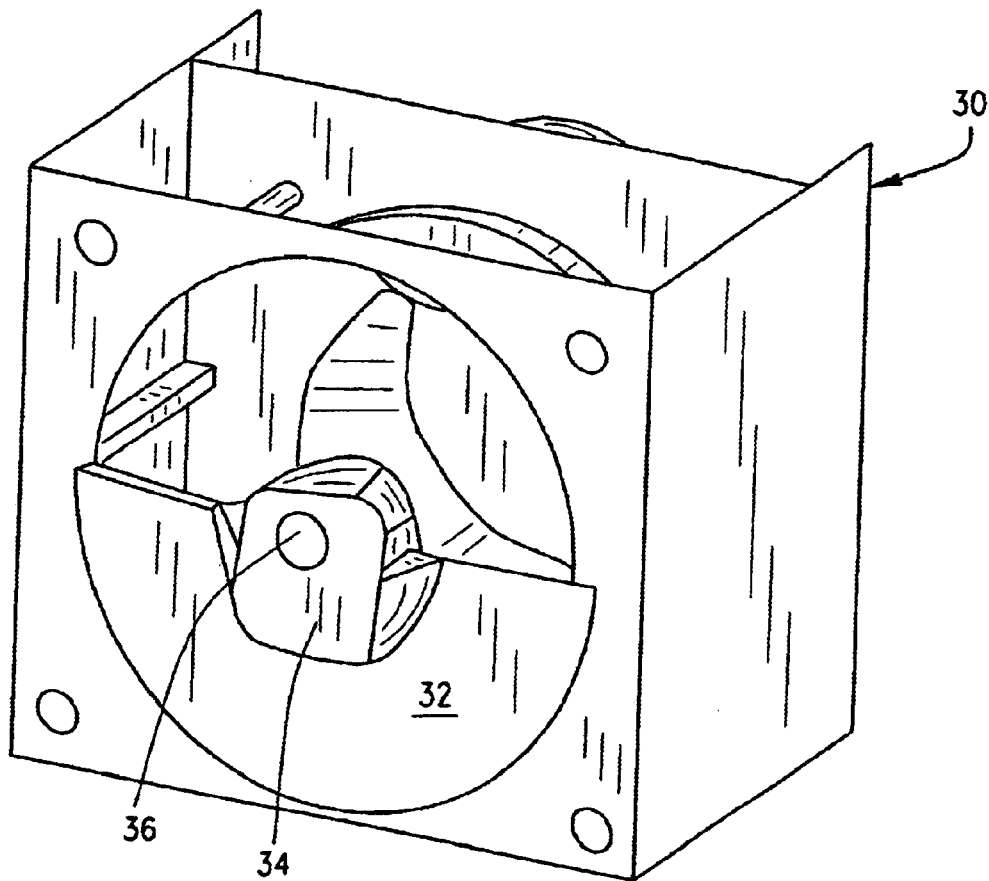
FIG. 2 is a perspective view of a bearing support bracket attached to a dynamoelectric machine.

FIG. 2 illustrates an exemplary frame 30, such as for dynamoelectric machine 10 (shown in FIG. 1), with which the invention may be practiced. A bearing support bracket assembly 32 is mounted, coupled, or otherwise attached to frame 30 and supports a bearing assembly 34. Bearing assembly 34 includes a bore 36 which receives, and allows rotation of, a rotor shaft, such as rotor shaft 24 (shown in FIG. 1). It is contemplated that the present invention may be practiced with a variety of bearing assemblies similar or dissimilar to bearing assembly 34. Therefore, bearing assembly 34 is illustrated for exemplary purposes only and is not intended to limit the invention to any particular type of bearing assembly. It is further contemplated that other frames may be used to receive bearing support bracket assembly 32 within the scope of the present invention.

Figure 3:
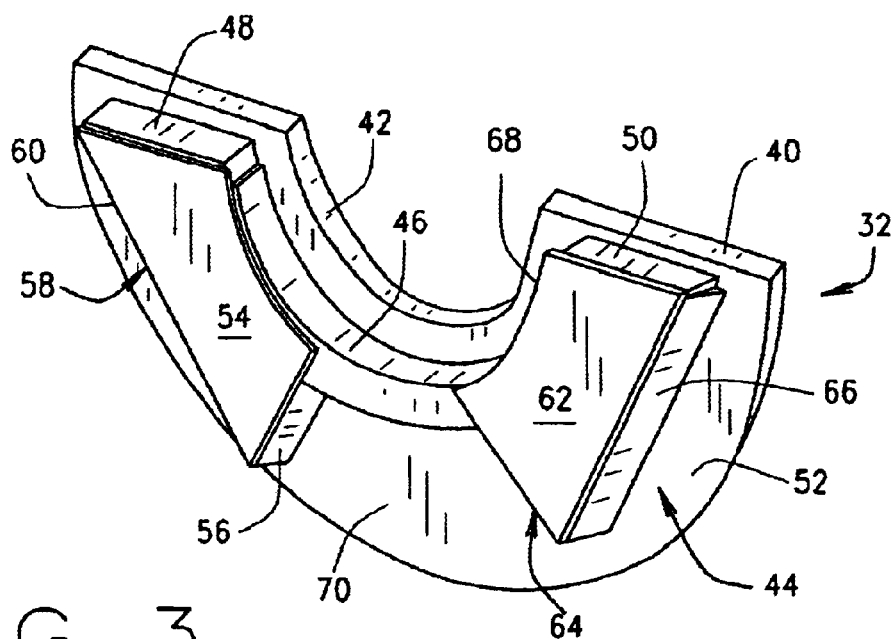
FIG. 3 is a perspective view of the bearing support bracket shown in FIG. 2.
Figure 4:
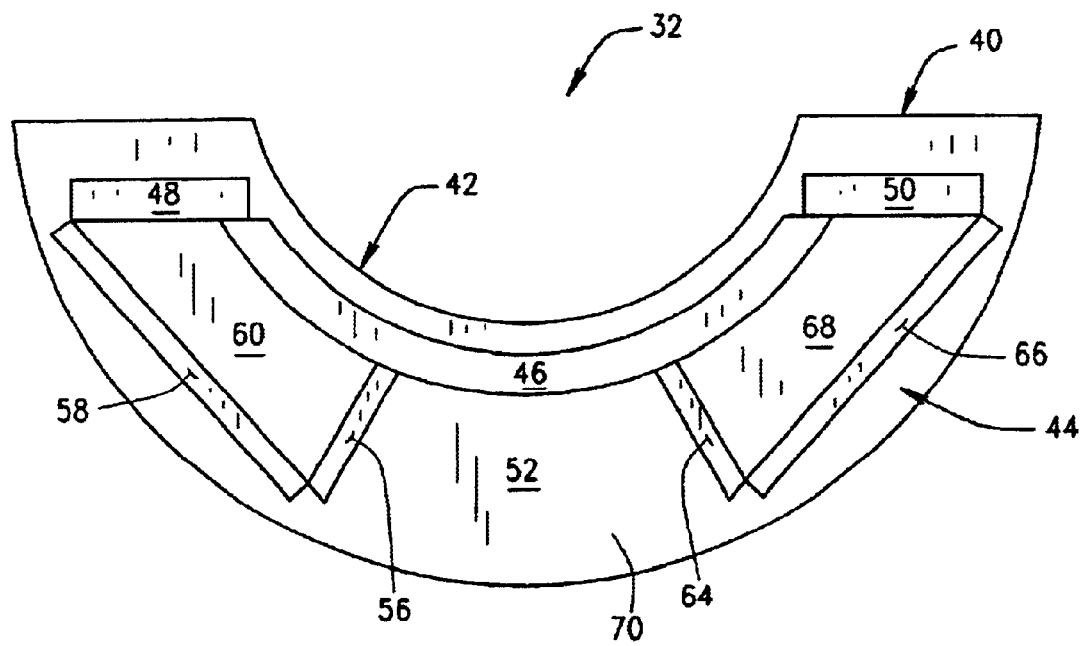
FIG. 4 is a front view of the bearing support bracket shown in FIG. 3 without support plates.
Figure 5:
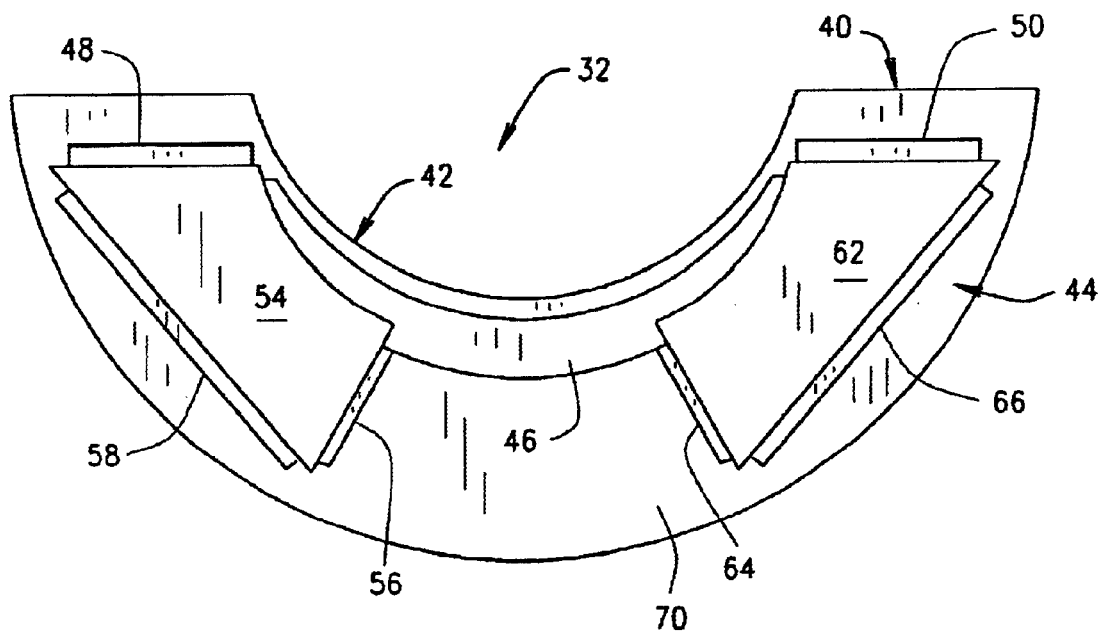
FIG. 5 is a front view of the bearing support bracket shown in FIG. 4 with support plates.
Figure 6:
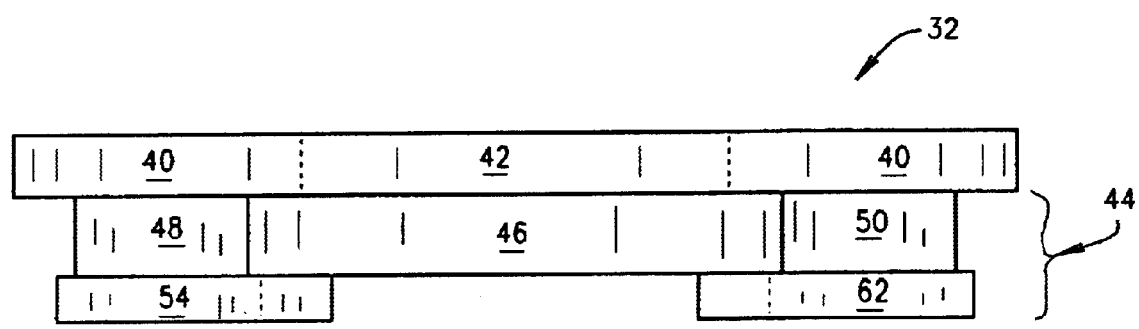
FIG. 6 is a top view of the bearing support bracket shown in FIG. 5.

FIG. 3 illustrates bracket assembly 32 including a base plate 40 having a bearing mounting surface 42. Bracket assembly 32 also, includes a bracket support assembly 44 including a support member 46, a first end plate 48 and a second end plate 50. Support member 46 is a semi-annular ring extending between first end plate 48 and second end plate 50. In an alternative embodiment, support member 46 is fabricated from a plurality of members to form a curved section that extends between first end plate 48 and second end plate 50. End plates 48 and 50 extend substantially perpendicularly from a base plate outer surface 52. In one embodiment, plates 48 and 50 are substantially flat and contact support member 46.

In one embodiment, a first support plate 54 extends from first end plate 48 and support member 46 and is spaced a distance (not shown) from base plate 40. A first intermediate end plate 56 and a first side plate 58 extend from base plate 40 to first support plate 54. A first enclosure 60 is formed by base plate 40, first support plate 54, first end plate 48, first intermediate end plate 56 and first side plate 58. First enclosure 60 has a hollow space therein. A second support plate 62 extends from second end plate 50 and support member 46 and is spaced a distance (not shown) from base plate 40. A second intermediate end plate 64 and a second side plate 66 extend from base plate 40 to second support plate 62. A second enclosure 68 is formed by base plate 40, second support plate 62, second end plate 50, second intermediate end plate 64 and second side plate 66. Second enclosure 68 has a hollow space therein. Support member 46 defines an inner edge of first support plate 54 and second support plate 62.

First support plate 54 and second support plate 62 are separated by a base plate intermediate region or arc segment 70. Enclosures 60 and 68 reinforce bracket assembly 32 and provide a configuration effectively achieving the desired natural frequency which is unlikely to be excited in use. In one embodiment, first and second intermediate end plates 56 and 64 are substantially flat and extend substantially radially from support member 46. In addition, first side plate 58 and second side plate 66 are substantially flat In alternative embodiments, plates 48, 50, 56, 58, 64 and 66 are not substantially flat.

A base plate intermediate region 70 is substantially centered, or positioned equidistant from first end plate 48 and second end plate 50. In one embodiment, support plates 54 and 62 and base plate 40 are substantially planar and base plate 40 is substantially parallel to support plates 54 and 62. In an alternative embodiment, a third support plate extends across base plate intermediate region 70 and forms a third enclosure. In a further alternative embodiment, a single support plate extends from first end plate 48 to second end plate 50. In still further alternative embodiments, any number of support plates can be utilized to extend wholly or partially between first end plate 48 and second end plate 50.

The stiffness of bracket assembly 32 is altered by altering the size of enclosures 60 and 68. Bracket assembly 32 is stiffened by positioning support plates 54 and 62 further from base plate 40. In addition, the stiffness of bracket assembly 32 is altered by altering the thickness of plates 40, 48, 50, 54, 56, 58, 62, 64 and 66 and support member 46.

Bracket assembly 32 is fabricated by connecting support member 46, end plate 48, intermediate end plate 56, and side plate 58 to base plate 40 and support plate 54 by welding. Similarly, support member 46, end plate 50, intermediate end plate 64, and side plate 66 are connected to base plate 40 and support plate 62 by welding. Alternatively, the connections are other than by welding.

In an alternative embodiment, bracket assembly 32 is fabricated by casting a single plate having a substantially flat portion and an incorporated stiffening portion. The plate is thinner at the bottom and becomes thicker towards the top. In one embodiment, the transition between the flat portion and the stiffening portion is gradual. In an alternative embodiment, the transition between the flat portion and the stiffening portion is substantially immediate.

While one exemplary embodiment has been described, it is contemplated that other shapes of bracket support assembly 44 and relative positioning of base intermediate region 70 are used in alternative embodiments while achieving the benefits of the present invention.

In practice, bracket assembly 32 is subject to static and dynamic stresses from supporting a dynamoelectric machine rotor structure and associated components coupled to the machine. A varying degree of vibration is experienced by bracket assembly 32 due to varying loads and operating conditions. Bracket support assembly 44 adds stiffness to bracket assembly 32 and reinforces bracket assembly 32. Because of the reinforcement, bracket assembly 32 provides a configuration effectively achieving the desired natural frequency which is unlikely to be excited in use.

While the invention has been described in terms of various specific embodiments, those skilled in the art will recognize that the invention can be practiced with modification within the spirit and scope of the claims.

What is claimed is:

1. A bracket assembly for a dynamoelectric machine comprising:
    a base plate; and
    a bracket support assembly extending from said base plate, said bracket support assembly comprising:
        a first end plate extending from said base plate, a second end plate extending from said base plate, a support member extending from said base plate and between said first end plate and said second end plate, a first intermediate plate extending from said base plate, and a second intermediate plate extending from said base plate;
        a first support plate extending from said first end plate, said support members, said first intermediate plate, and a first side plate such that said first support plate forms a first enclosure, said first side plate extending from said base plate to said first support plate;
        a second support plate extending from said second end plate and an intermediate region extending between said first and second support plates, said intermediate region comprises an arc segment.

2. A bracket assembly in accordance with claim 1 wherein said base plate is substantially planar.

3. A bracket assembly in accordance with claim 1 wherein said first and second support plates are substantially planar, said second support plate extending from said support member, said second intermediate plate, and a second side plate such that said second support plate forms a second enclosure, said second side plate extending from said base plate to said second support plate.

4. A bracket assembly in accordance with claim 1 wherein said first and second support plates are parallel to said base plate.

5. A bracket assembly in accordance with claim 1 wherein said first and second intermediate end plates are located between said first end plate and said second end plate.

6. A bracket assembly in accordance with claim 5 wherein said first and second intermediate end plates are connected to said first and second support plates.

7. A bracket assembly in accordance with claim 1 wherein said support member is curved, said first and second intermediate end plates extend radially from said support member.

8. A bracket assembly in accordance with claim 1 wherein said first and second support plates comprises semi-annular plates.

9. A bracket assembly in accordance with claim 1 further comprising a plurality of support plates including said first and second support plates.

10. A bracket assembly in accordance with claim 1 wherein said bracket is symmetrical.

11. A bracket assembly in accordance with claim 1 wherein each said first and second enclosure includes a hollow space.

12. A dynamoelectric machine comprising:
    a frame;
    a stator disposed in said frame and comprising a stator bore;
    a rotor within said stator bore and comprising a rotor shaft;
    a bearing assembly for supporting said rotor shaft and facilitating rotational movement thereof; and
    a bracket assembly coupled to said frame and receiving said rotor shaft, said bracket assembly comprising a base plate and a bracket support assembly extending therefrom, said bracket support assembly comprising:

a first end plate extending from said base plate, a second end plate extending from said base plate, a support member extending from said base plate and between said first end plate and said second end plate, a first intermediate plate extending from said base plate, and a second intermediate plate extending from said base plate;

a first support plate extending from said first end plate, said support member, said first intermediate plate, and a first side plate such that said first support plate forms a first enclosure, said first side plate extending from said base plate to said first support plate;

a second support plate extending from said second end plate and an intermediate region extending between said first and second support plates, said intermediate region comprises an arc segment.

13. A dynamoelectric machine in accordance with claim 12 wherein said base plate is substantially planar.

14. A dynamoelectric machine in accordance with claim 12 wherein said first and second support plates are substantially planar, said second support plate extending from support member, said second intermediate plate, and a second side plate such that said second support plate forms a second enclosure, said second side plate extending from said base plate to said second support plate.

15. A dynamoelectric machine in accordance with claim 12 wherein said base plate is substantially parallel to said first and second support plates.

16. A dynamoelectric machine in accordance with claim 12 wherein said first and second intermediate end plates are located between said first end plate and said second end plate.

17. A dynamoelectric machine in accordance with claim 12 wherein said bracket is symmetrical.

18. A dynamoelectric machine in accordance with claim 16 wherein said support member is curved, said first and second intermediate end plates extend radially from said support member.

19. A dynamoelectric machine in accordance with claim 12 wherein said first and second support plates comprise semi-annular plates.

20. A dynamoelectric machine in accordance with claim 12 further comprising a plurality of support plates including said first and second support plates.

21. A dynamoelectric machine in accordance with claim 12 wherein each said first and second enclosure includes a hollow space.

* * * * *

UNITED STATES PATENT AND TRADEMARK OFFICE
CERTIFICATE OF CORRECTION

| | | |
|---|---|---|
| PATENT NO. | : 6,906,440 B1 | Page 1 of 1 |
| APPLICATION NO. | : 09/602525 | |
| DATED | : June 14, 2005 | |
| INVENTOR(S) | : Fife | |

It is certified that error appears in the above-identified patent and that said Letters Patent is hereby corrected as shown below:

In Claim 1, column 4, line 15, delete "support members, said" and insert therefor -- support member, said --.

In Claim 8, column 4, line 46, delete "plates comprises" and insert therefor -- plates comprise --.

Signed and Sealed this

Fourth Day of March, 2008

JON W. DUDAS
*Director of the United States Patent and Trademark Office*